Nov. 30, 1926.
K. EHRGOTT
1,608,782
ELECTRIC RANGE
Filed Jan. 27, 1925
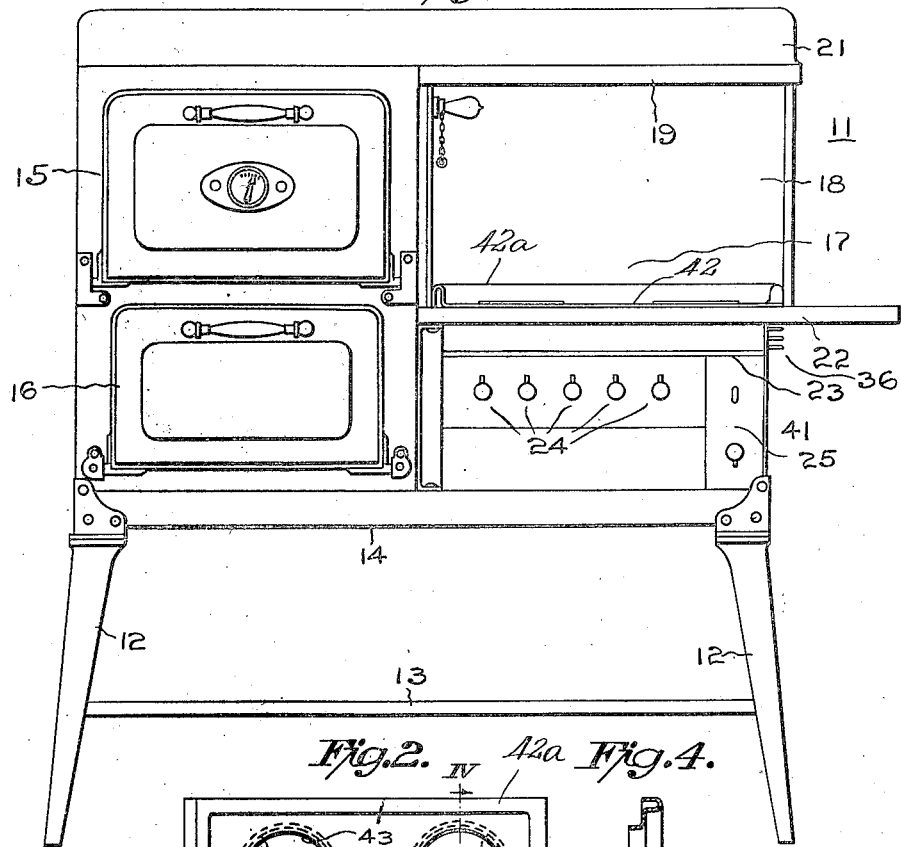
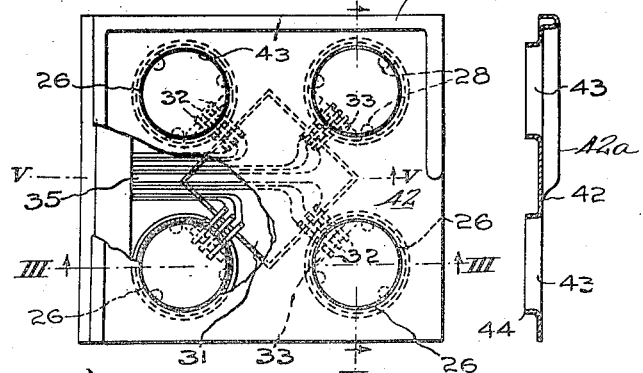
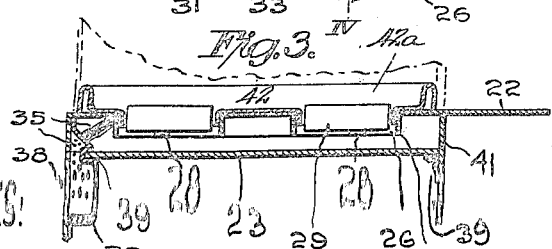
WITNESSES:
R. S. Harrison
H. M. Biebel
INVENTOR
Karl Ehrgott
BY
Wesley G. Carr
ATTORNEY cover platform and permitting of easy and quick connection, disconnection, insertion and removal of the heating units, as may be necessary or desirable.

Various modifications and changes may be made without departing from the spirit and scope of the invention, and I desire therefore that only such limitations shall be placed thereon as are imposed by the prior art.

Nov. 30, 1926.
C. J. V. FÉRY
1,608,786
ELECTROMAGNETIC DEVICE
Filed April 18, 1925
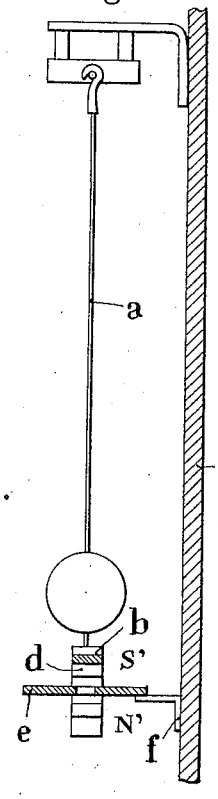
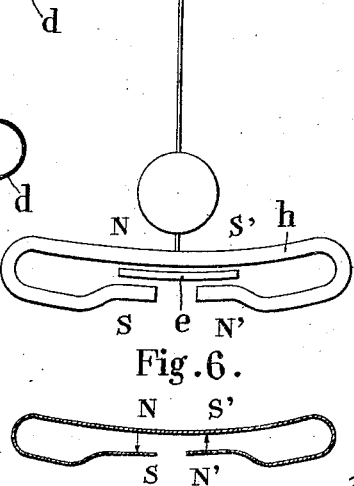
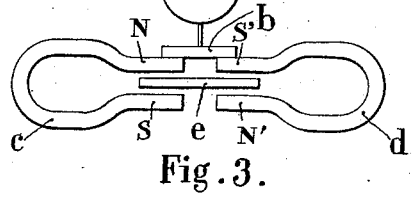
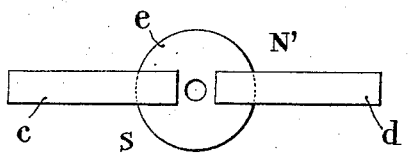
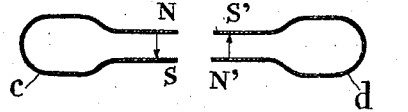

I claim as my invention:

1. In an electric range, the combination with a sub-platform having openings therein, and electric heating elements supported by said sub-platform in the openings thereof, of a removable cover platform for said sub-platform having interfitting engagement therewith.

2. In an electrically heated device, the combination with a plurality of heating elements, and a platform for supporting said elements, of a removable cover platform located on said first platform and having openings therethrough within which said heating elements are located.

3. In an electric range, the combination with a sub-platform having openings therein, and electric heating elements located in said openings and supported by said sub-platform, of a removable main platform located on said sub-platform and having annular depending flanges fitting into the openings in said sub-platform.

4. In an electric range, the combination with a sub-platform having openings therein, and electric heating elements supported by said sub-platform in the openings thereof, of a removable cover platform for said sub-platform having integral depending flanges fitting into said openings.

5. In an electric range, the combination with a sub-platform having openings therein, and electric heating elements supported by said sub-platform in said openings, of a removable cover platform for said sub-platform supported thereon and having openings therein registering with the openings in said sub-platform and having depending annular flanges fitting into said openings.

6. An electric range comprising a sub-platform having a plurality of openings therein, a plurality of removable heating elements supported in certain of said openings by said sub-platform, said elements having terminal members extending laterally below said platform and into an opening centrally located with respect to certain of said openings, whereby the terminals of said heating elements are rendered accessible through said centrally located opening for connection to electric conductors.

7. In an electric range, the combination with a sub-platform having openings therein, and electric heating elements supported by said sub-platform in the openings thereof, of a removable cover member superposed upon said sub-platform having integral depending flanges fitting into said openings.

In testimony whereof, I have hereunto subscribed my name this 10th day of January, 1925.

KARL EHRGOTT.